(12) United States Patent  
Mustafa

(10) Patent No.: US 8,365,045 B2
(45) Date of Patent: Jan. 29, 2013

(54) FLOW BASED DATA PACKET PROCESSING

(75) Inventor: Shakeel Mustafa, Fremont, CA (US)

(73) Assignee: NetCee Systems, Inc.

( * ) Notice: Subject to any disclaimer, the term of this patent is extended or adjusted under 35 U.S.C. 154(b) by 1085 days.

(21) Appl. No.: 12/331,241

(22) Filed: Dec. 9, 2008

(65) Prior Publication Data

US 2009/0147683 A1 Jun. 11, 2009

Related U.S. Application Data

(60) Provisional application No. 61/005,925, filed on Dec. 10, 2007.

(51) Int. Cl.
G06F 11/00 (2006.01)
(52) U.S. Cl. .......................... 714/776; 370/235; 370/392
(58) Field of Classification Search .................. 714/776; 370/235, 392
See application file for complete search history.

(56) References Cited

U.S. PATENT DOCUMENTS

| 7,340,535 | B1 * | 3/2008 | Alam | 709/246 |
| 7,443,796 | B1 * | 10/2008 | Albert et al. | 370/235 |
| 7,644,080 | B2 * | 1/2010 | Mammen et al. | 707/713 |
| 7,944,828 | B2 * | 5/2011 | Ronciak et al. | 370/230 |
| 8,111,690 | B2 * | 2/2012 | Hussain et al. | 370/389 |
| 2010/0202292 | A1 * | 8/2010 | Nemirovsky et al. | 370/235 |

* cited by examiner

Primary Examiner — Marc Duncan

(57) ABSTRACT

Flow based data packet processing is disclosed. In one embodiment, a method for processing a data packet in a flow comprises identifying a flow Identification (ID) of the data packet, where the flow ID is based on one or more portions of control information for the data packet. The method also comprises accessing an address pointer stored in a shared memory designated for the flow ID. The method further comprises performing a set of instructions stored in an address in a cache memory which is assigned by the address pointer, wherein the set of instructions is loaded to the address in the cache memory upon identifying of the flow ID if the flow is currently active. Additionally, the method comprises generating report data associated with the flow by executing the set of instructions.

20 Claims, 12 Drawing Sheets

FLOW BASED DATA PACKET PROCESSING

RELATED APPLICATIONS

Benefit is claimed under 35 U.S.C §119(e) of U.S. provisional application No. 61/005,925 entitled "system and method for executing pattern matching" filed on Dec. 10, 2007, which is herein incorporated in its entirety by reference for all purposes. Additionally, U.S. application Ser. No. 12/183,722 filed on Jul. 31, 2008 and U.S. application Ser. No. 12/255,305 filed on Oct. 21, 2008 describe the related technology and are herein incorporated by reference in their entirety for all purposes.

FIELD OF TECHNOLOGY

This disclosure relates generally to communication systems, methods, and devices for data packet processing.

BACKGROUND

A deep packet inspection (DPI) is a form of computer network packet filtering that examines data and/or header part of a packet as it passes an inspection point. During the inspection, non-protocol compliance, viruses, spam, intrusions or predefined criteria may be perused to decide if the packet can pass or if it needs to be routed to a different destination.

There are several methods of the DPI, which include analyses by port, by string match, by numerical properties, and by behavior and heuristics. Among the methods, the analysis by string involves the search for a sequence of textual characters or numeric values within the contents of one or more packets. Since the method involves the comparison of data patterns to textual characters within the contents of the packet, it often takes long time to complete the task when the data patterns or the textual characters are many. Since the packets have to be processed with the arduous pattern matching routine, a delay in the flow of communication can result. This becomes even more problematic especially for ultra high speed communication systems.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

An embodiment described in the detailed description is directed to a method for processing a data packet in a flow which comprises identifying a flow Identification (ID) of the data packet, where the flow ID is based on one or more portions of control information for the data packet. The method also comprises accessing an address pointer stored in a shared memory designated for the flow of the data packet, where a location of the address pointer in the shared memory is determined by the flow ID of the data packet. The method further comprises performing a set of instructions stored in an address of a cache memory which is referred by the address pointer, where the set of instructions is associated with the flow of the data packet and is loaded to the address in the cache memory upon identifying of the flow ID if the flow is currently active. Additionally, the method comprises generating report data associated with the flow by executing the set of instructions.

Another embodiment described in the detailed description is directed to a method for identifying an IP protocol type of a data packet which comprises accessing 2 bytes of an Ethertype field and 1 byte of an IP protocol type field of the data packet. The method further comprises performing an exclusive OR (XOR) operation to the 2 bytes of the Ethertype field for the data packet and corresponding 2 bytes designated for an Ethertype field of an internet protocol version 4 (IPv4) to generate a first value, where the 2 bytes of the Ethertype field of the IPv4 is 0 X 0800 (hex). In addition, the method comprises adding a first byte of the first value and a second byte of the first value to generate a second value, and appending the 1 byte of the IP protocol type field to the second value to generate a third value if the second value matches with 0 X 00 (hex). Furthermore, the method comprises determining an IP protocol type of the data packet based on the third value.

As will be illustrated in the detailed description, other embodiments pertain to methods, systems, and devices that improve the efficiency of packet inspection and other types of packet processing. By using the flow based packet processing, which can easily classify and/or identify data packets based on the predetermined portions of the control information available in the data packets, data can be processed in a more flexible way. This is possible since the packet flow can be defined by combining two or more field locations of the control information based on the user's choosing. In addition, the packet processing can be expeditiously performed by first assuming the packets to be an IP protocol type and processing them accordingly. Since the IP protocol type is the most prevalent packet type, this can save packet processing time significantly.

BRIEF DESCRIPTION OF THE DRAWINGS

Example embodiments are illustrated by way of example and not limitation in the figures of the accompanying drawings, in which like references indicate similar elements and in which.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Briefly stated, embodiments pertain to methods, systems, and devices that improve the efficiency of packet inspection and other types of packet processing. By using the flow based packet processing, which can easily classify and/or identify data packets based on the predetermined portions of the control information available in the data packets, data can be processed in a more flexible way. This is possible since the packet flow can be defined by combining two or more field locations of the control information based on the user's choosing. In addition, the packet processing can be expeditiously performed by first assuming the packets to be an IP protocol type and processing them accordingly. Since the IP protocol type is the most prevalent packet type, this can save packet processing time significantly.

Figure 1:
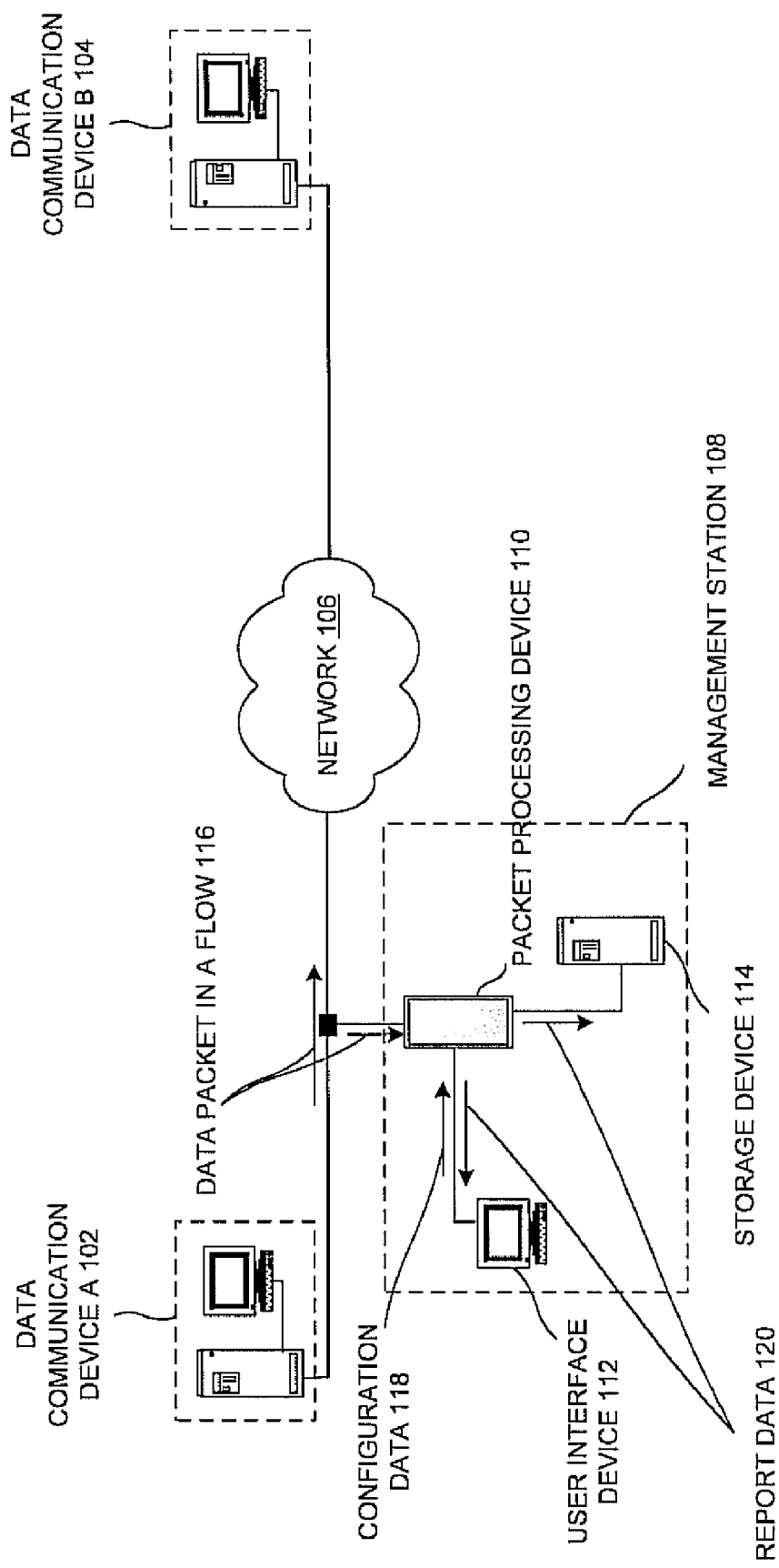
FIG. 1 is a network diagram of an exemplary packet processing device, according to one embodiment.

FIG. 1 is a network diagram of an exemplary packet processing device 110, according to one embodiment. In FIG. 1, a data communication device A 102 is coupled to a data communication device B 104 through a network 106. It is appreciated that the data communication device A 102 and/or the data communication device B 104 comprises a server, a client device, a router, etc.

In FIG. 1, a management station 108 is coupled to the network 106. The management station 108 comprises a packet processing device 110, a user interface device 112, and a storage device 114. In one embodiment, the packet processing device 110 may comprise a module (e.g., of software and/or hardware) for processing (e.g., inspecting) a data packet in a flow 116 having instructions that, when executed by a computer (e.g., the packet processing device 110), cause the computer to perform a method comprising identifying a flow Identification (ID) of the data packet, where the flow ID is based on one or more portions of control information for the data packet. It is appreciated that a flow of a data packet (e.g., the data packet in a flow 116) may be defined by any combination of one or more portions (e.g., fields) of control information of the data packet, such as a source address, destination address, etc.

If the flow ID of the data packet or the type of the data packet is configured for processing, the data packet may be subject to the set of instructions directed to the particular flow ID or packet type. For example, a user may enter configuration data 118 through a user interface device 112. Once the configuration data 118 is received by the packet processing device 110, the flag data for processing a particular packet type or packet flow may be set to "1." Otherwise, the flag data may remain at "0" for the packet type or flow. In one exemplary implementation, the packet type (e.g., an IP protocol type) or flow may be flagged for quality of service (QoS) checking. It is appreciated that the QoS refers to the ability to guarantee a certain level of performance to a data flow. For example, a required bit rate, delay, jitter, packet dropping probability, and/or bit error rate may be inspected for a packet flow whose flag is set for the QoS. Then the results of the inspection may be forwarded as report data 120 to the user interface device 112 and/or the storage device 114 (e.g., a data storage and/or SQL server).

Figure 2:
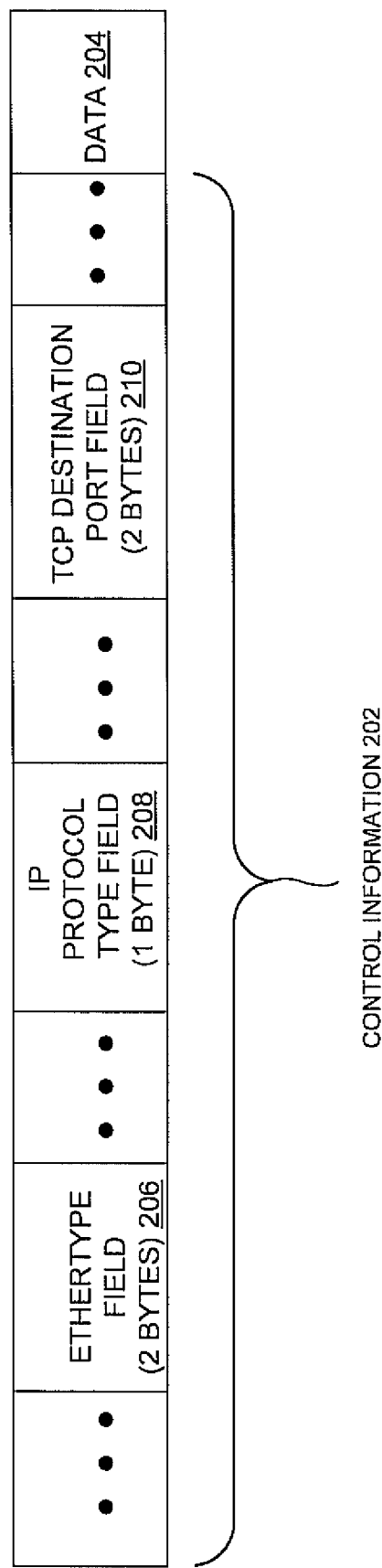
FIG. 2 illustrates an exemplary method for identifying a data packet using control information in predetermined field locations of the data packet, according to one embodiment.

FIG. 2 is illustrates an exemplary method for identifying a data packet using control information from its predetermined field locations, according to one embodiment. It is appreciated that the data packet comprises control information 202 and data 204. FIG. 2 illustrates a format of a typical networking packet whose packet type is defined and identified in terms of "vertexes" or one or more portions (e.g., fields) of the control information 202. It is appreciated that a vertex is defined as a predetermined field location within a data packet and can be used to determine the type of the data packet. In FIG. 2, a typical Ethernet packet format is used. To define a file transfer protocol, "FTP," three known vertexes in the typical Ethernet packet may be used.

As illustrated in FIG. 2, the first vertex is located at the field location of a 2-bytes Ethertype field 206, the second vertex is at the field location of a 1-byte IP protocol type field 208, and then the third vertex is at the field location of a 2-bytes TCP destination port field 210. For example, a data packet may be identified as a FTP packet if the Ethertype field has the value of 0 X 0800 (hex), IP protocol type field has the value of 0 X 06, and the TCP destination port is 21. All of the above values should be present at the specific locations (identified as vertexes) in the data packet in order to be recognized as a FTP packet. It is appreciated that a flow of the data packet may be defined in a similar manner.

It is also appreciated that the maximum number of possible combinations resulting from the three vertexes or field values, where the Ethertype field 206 is 2 bytes long, the IP protocol type field is 1 byte long, and the TCP destination port field is 2 bytes long, can result in $2^{16} \times 2^8 \times 2^{16} = 2^{40} = 1.09$ trillion. Thus, the proposed method of identifying a data packet based on one or more portions or vertexes of the control information 202 may be capable of handling the full range of the protocols pertaining to the data packet. Additionally, the method may be able to handle any user defined protocols.

Figure 3:
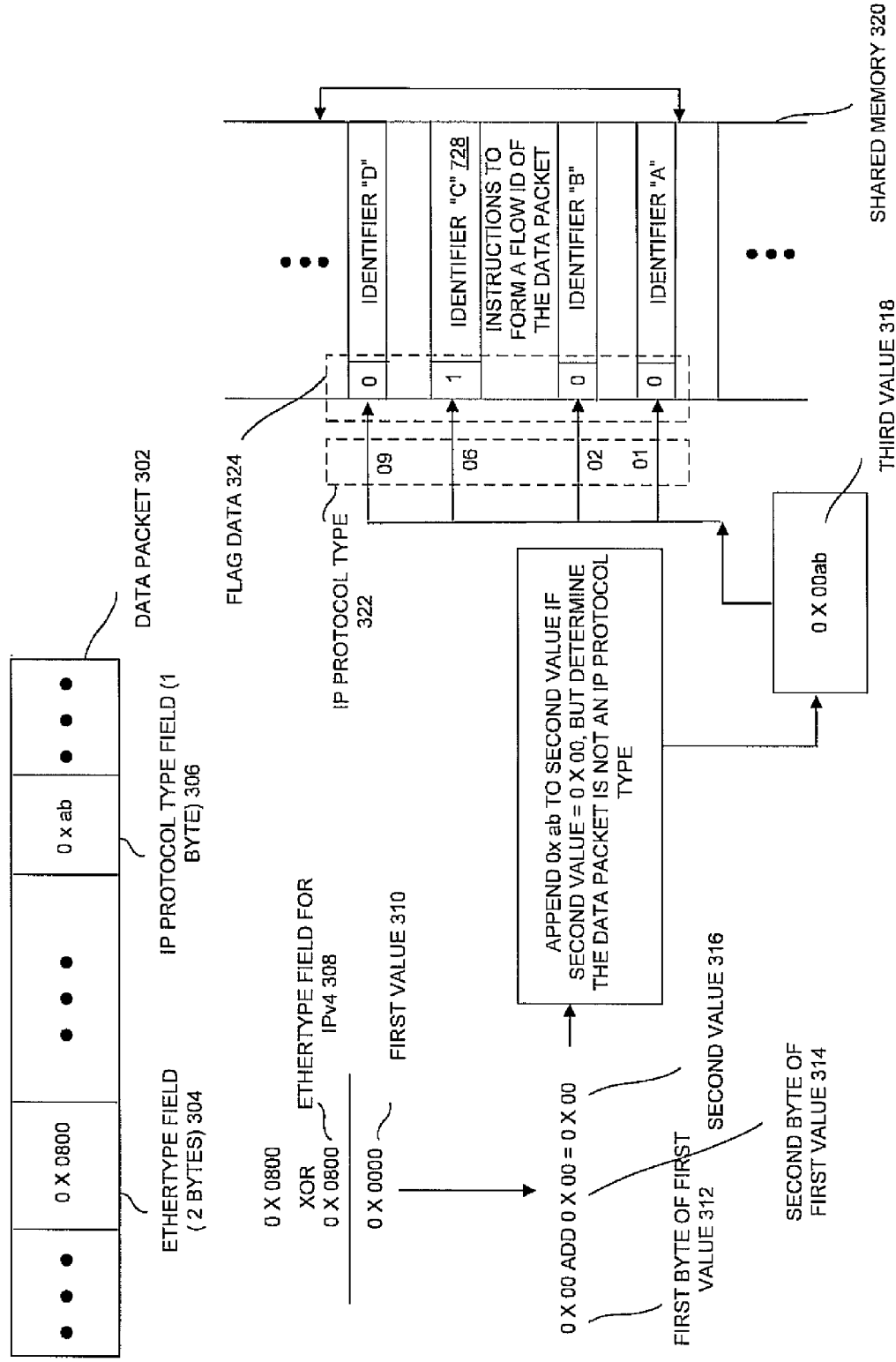
FIGS. 3 and 4 illustrate an exemplary process for expeditiously determining a protocol type, according to one embodiment.
Figure 4:
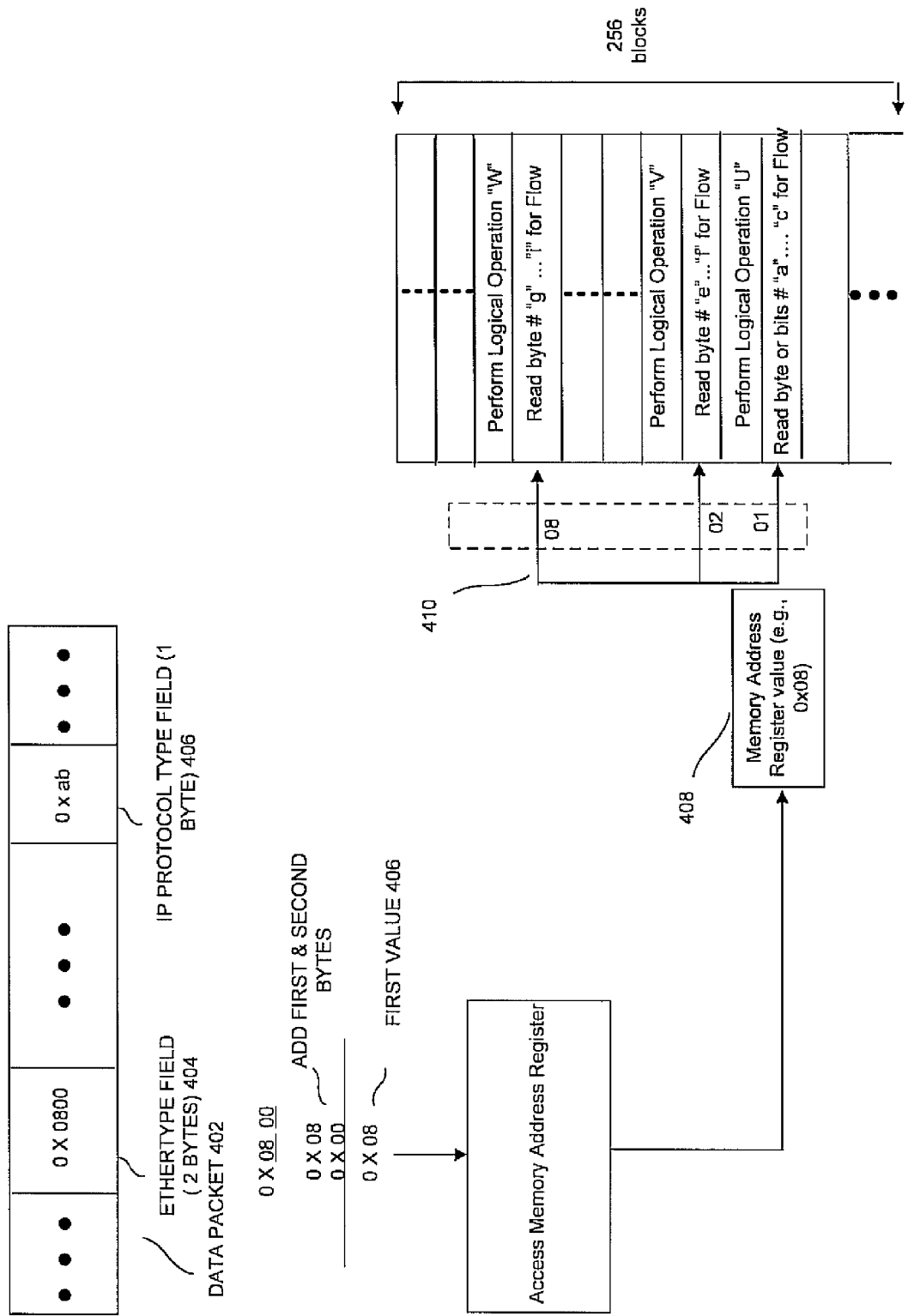

FIGS. 3 and 4 illustrate an exemplary process for expeditiously determining a protocol type, according to one embodiment. As illustrated in FIG. 3, in order to expeditiously identify the IP protocol type of a data packet 302, it is first assumed that the data packet 302 is an IP protocol type. Accordingly, 2 bytes of an Ethertype field 304 and 1 byte of an IP protocol type field 306 of the data packet are accessed (e.g., read, scanned, etc.). Then, an exclusive OR (XOR) operation is performed to the 2 bytes of the Ethertype field 304 and corresponding 2 bytes designated for an Ethertype field for an internet protocol version 4 (IPv4) 308 to generate a first value 310, where the 2 bytes of the Ethertype field for the IPv4 308 is 0 X 0800 (hex). Next, a first two bytes of the first value 312 and a second two bytes of the first value 314 are added to generate a second value 316. This step is performed to reduce the memory size from 4 hex bytes to 2 hex bytes since the addition of the 2 hex bytes of the first value 312 and the 2 hex bytes of the second value 314 results in two hex bytes as long as the result of the XOR operation generates the first value of 0 X 0000 (hex).

If the second value 316 does not match with 0 X 00 (hex), the data packet may be determined as a non-IP protocol type, thus calling for a different algorithm or state machine than the one described here to deal with the situation. With the reduction of the memory, the 1 byte of the IP protocol type field 306 of the data packet is appended to the second value 316 to generate a third value 318 if the second value 316 matches with 0 X 00 (hex). Once the third value 318 is obtained, the IP protocol type of the data packet is determined based on the third value 318.

Furthermore, a shared memory 320 may store one or more instructions to form a flow ID of the data packet 302 for each protocol type or packet type. As for the IP protocol type, there may be 256 slots reserved for the identification of the 256 available IP protocol types as well as sets of instructions to form their respective packet flow IDs. Additionally, flag data 326 may be used to determine status of the flow IDs in the shared memory 320. For example, the flag data 320 for the TCP type packet is set to "1" which indicates that data packets of the TCP type may be inspected for preconfigured data packet processing (e.g., inspection, QoS, etc.). Additionally, the flag data may be set or reset by forwarding an identifier (e.g., an identifier "C" 328) to the packet processing device 110 from the user interface data 112, as illustrated in FIG. 1.

Similarly, a different approach in FIG. 4 is illustrated to identify packet type. Accordingly, 2 bytes of an Ethertype field 404 are added together to form a single byte. In the case of an IP V.4 the resulting number would be 0x08 as indicated through First Value 406. This result is used as an index pointer and placed in the Memory Address Register 408. For a non-IP number the result would be different than 0x08 in the case of IP version 4 and in the case of IP version 6.

It is appreciated that the most used protocols identified through Ethertype field in the Ethernet data-link layer protocols are few and can be easily identifiable through a single byte field. If there are collisions, meaning two or more Protocols yielding to the same single byte number, then the other logical operations can be placed to identify them. In the case of an IP v.4 header the memory location number 8 will be accessed in 410. Within this memory location the locations of the other bytes within the header and even in the pay load within a packet is indicated. These are the designated bytes which can be used to form a Flow. Once these bytes are read, then the adjacent memory locations can also contain the instructions of the logical operations to be performed on these bytes. For example, a Source IP address being indicated by the four bytes number located within the IP header. The four bytes represent a network address belonging to a host. It may be desirable to form an address specifically referring to a network. This can be formed by performing AND logical operation with zeros to any number of bytes within the four bytes of network address.

Figure 5:
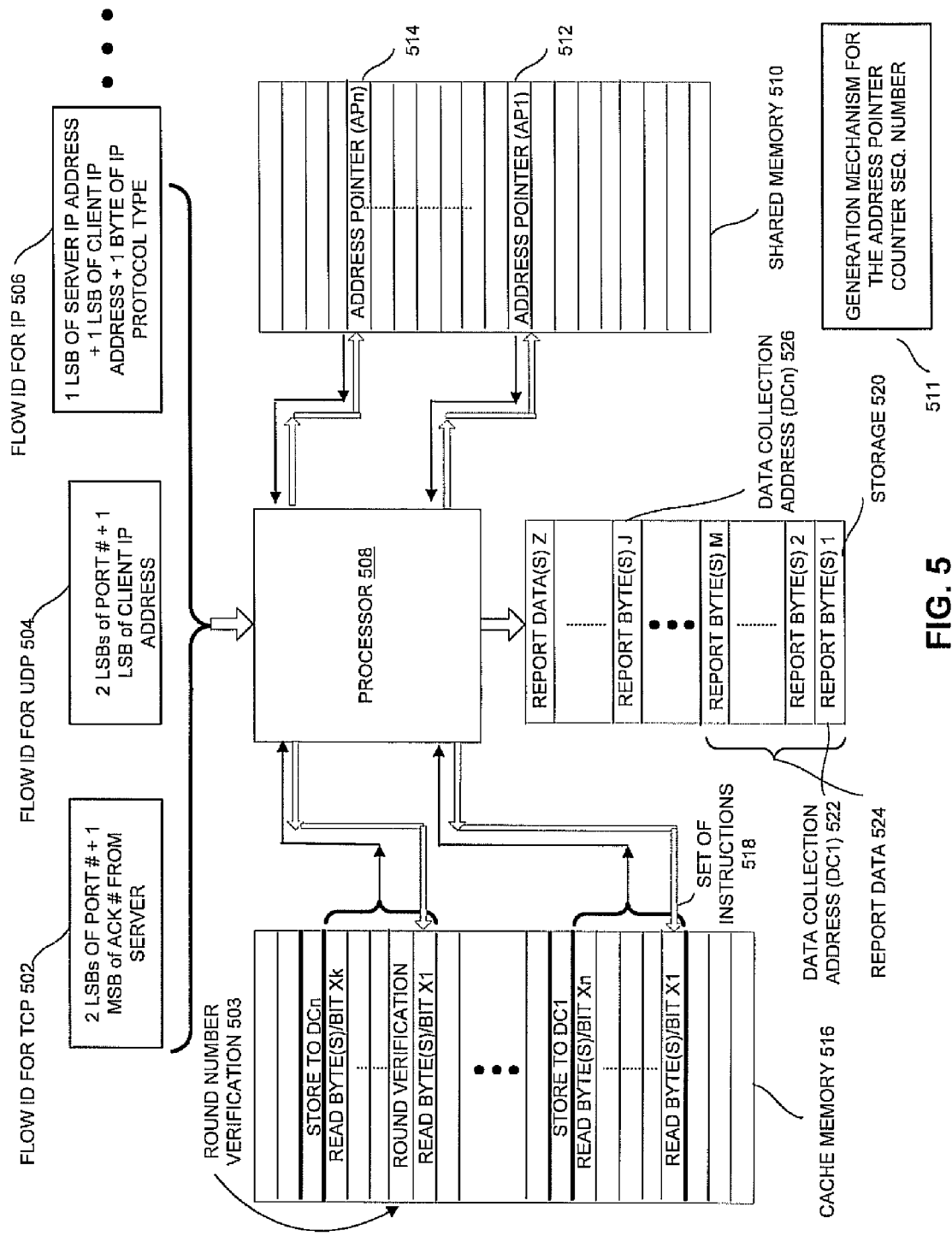
FIG. 5 illustrates an exemplary system diagram which executes the method described in FIG. 3 or FIG. 4, according to one embodiment.

FIG. 5 illustrates an exemplary system diagram which executes the method described in FIG. 3 or FIG. 4, according to one embodiment. It is appreciated that a processor 508 may be used to perform steps or processes described below. As illustrated in FIG. 5, a flow ID can be generated by combining one or more portions (e.g., fields) or vertexes of control information of a data packet. For example, a flow ID of a data packet whose IP protocol type is transmission control protocol (TCP) 502 may be generated by combining 2 least significant bytes (LSBs) of port number and 1 most significant byte (MSB) of acknowledgement number from the server. In another example, a flow ID of a data packet whose IP protocol type is user datagram protocol (UDP) may be generated by combining 2 LSBs of port number and 1 LSB of the IP address of the client device (e.g., see 504). In yet another example, a flow ID of a data packet whose IP protocol type is IP (IP in IP) may be generated by combining 1 LSB of server IP address, 1 LSB of the IP address of the client device, and 1 byte of the IP protocol type (e.g., see 506).

As illustrated in FIG. 5, the flow ID of the data packet, such as the data packet in a flow 116 of FIG. 1, is identified. Once the flow ID is identified, an address pointer (e.g., AP1 512, APn 514, etc.) stored in a shared memory 510 designated for the flow of the data packet is accessed. A Shared Memory Block size tends to be large so it can accommodate a large range of memory locations that can be accessed by large numeric number as indicated by the Flow ID. For example, if a Flow is represented by a 3-bytes number, meaning with 24 bits then Flow ID being represented by this bit range could vary from "0" to 16 Millions. If we need to store the management information about each Flow then each Flow may take another one Kbytes, for example, meaning that the required total Shared Memory size could be 16 M×1 k=16 Mbytes. This significant memory size can be saved by putting the index pointer into the shared memory and then mapping it to a Cache memory. At any point during network operations it is not likely that there will be 16 Millions Flows that will be active simultaneously.

For example, the reality is that only 10,000 Flows may active at any given time. If an address pointer for the flow ID doesn't exist in the shared memory 510, the address pointer may be generated and stored in the shared memory 510. The address pointer is generated by an Address Pointer Counter 511. The said Address Pointer Counter generates the pointer value in such a way that it always ensures a contiguous use of the Cache Memory 516 in blocks. It is appreciated that the location of the address pointer in the shared memory 510 may be determined by the flow ID of the data packet Once the address in a cache memory 516 referred by the address pointer is located, a set of instructions (e.g., a set of instructions 518) stored in the address in the cache memory 516 is performed. The set of instructions may be generated in response to configuration data (e.g., the configuration data 118 of FIG. 1) received prior to the processing of the data packet. The set of instructions may be associated with the flow of the data packet and is loaded to the address in the cache memory when the flow ID is identified and if the flow is currently active. In addition, the set of instructions may be associated with a check for quality of service (QoS) of a network processing the data packet, where the QoS refers to the ability to guarantee a certain level of performance to the data flow. For example, a required bit rate, delay, jitter, packet dropping probability, and/or bit error rate may be inspected for the QoS.

The utilization of the cache memory 516 may save memory space and execute the instructions faster as it allows loading and processing of the instructions for the currently active flows faster than any other type of memory (e.g., the shared memory 510). Once the instructions are executed, the results can be generated as report data 524. Additionally, an address pointer for a memory location (e.g., DC1 522) for storing the report data 524 in a storage 520 may be generated. The report data 524 may be forwarded to a display, such as the user interface device 112 of FIG. 1, or stored to the storage 520. The report data 524 may be generated for any data packet of the IP protocol type or for any data packet sharing the same flow ID if a flag data for processing (e.g., inspecting) of the IP protocol type or flow ID is set.

Figure 6:
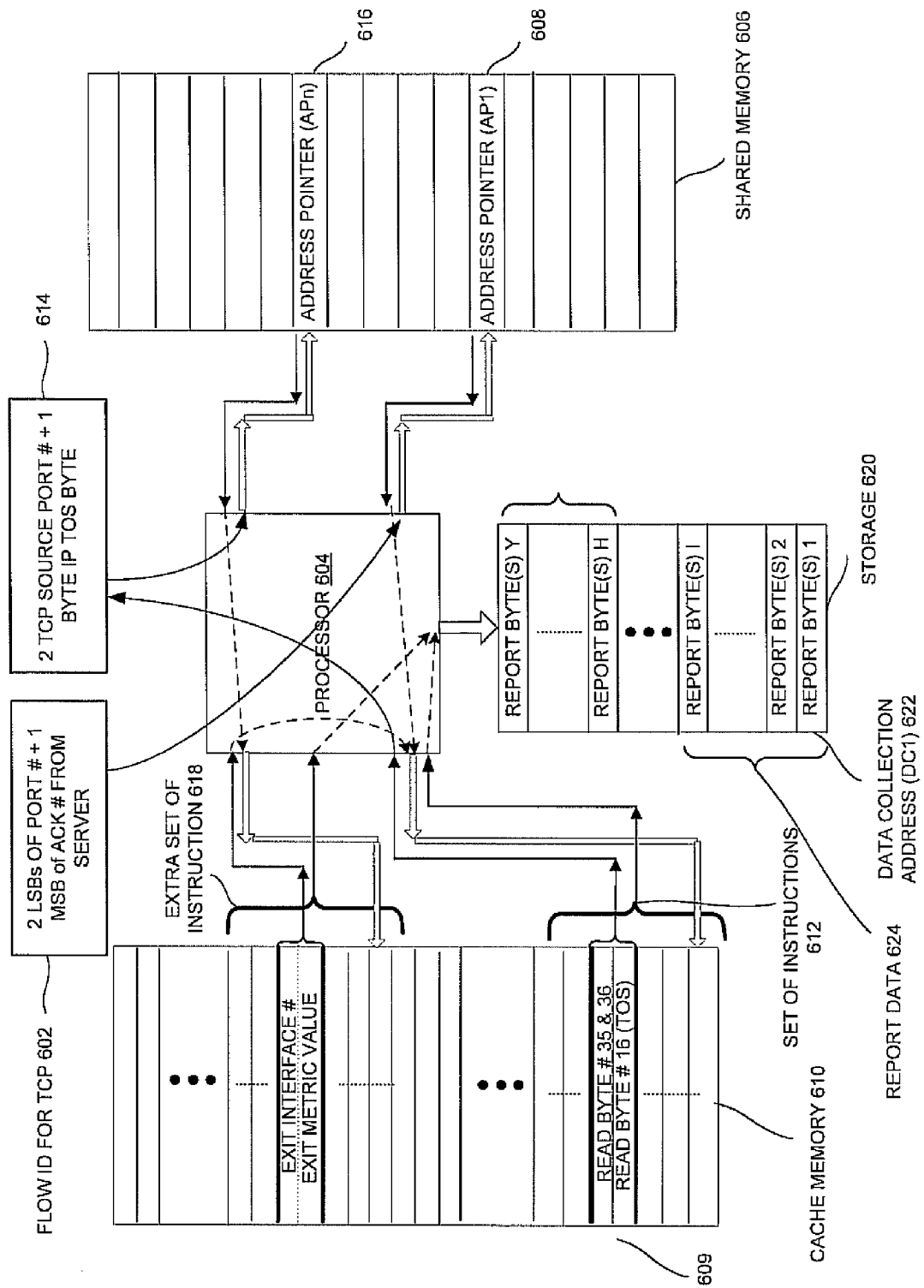
FIG. 6 illustrates an exemplary system diagram for executing nested flows of data packets, according to one embodiment.

FIG. 6 illustrates an exemplary system diagram for executing nested flows of data packets, according to one embodiment. In this example, it needs to be decided that a TCP based Flow should be able to select different treatments within a router or selects an egress interface based on the ToS bytes as embedded in the IP header of a packet. It is appreciated that ToS byte within an IP heard is identified through different bit values Each bit value set in the ToS byte would result to have a different treatment in router or through an egress interface. For example, the following bit values set in the ToS byte of a packet can be interpreted to achieve different results 000 (0)—Routine
001 (1)—Priority
010 (2)—Immediate
011 (3)—Flash
100 (4)—Flash Override
101 (5)—Critical
110 (6)—Internetwork Control
111 (7)—Network Control It is appreciated that a processor 604 may be used to perform steps or processes described below. In FIG. 6, during the initial setup of the flow ID for TCP 602 is identified, and then an address pointer AP1 is generated and stored as Address Pointer (AP1) 608 in the Shared Memory 606. It should be appreciated that the location 608 is previously identified through the bit values by combining certain bytes that uniquely defined a TCP Flow 602. Once the address in a cache memory 610 referred by the address pointer is located, a set of instructions 612 may be executed starting from the address. As indicated that the Address Pointer, AP1, refers to the memory location 609 which contains an instruction of reading another set of byte location as identified through the position of Byte #35 & 36. For example, the Byte #35 and 36 point out to the two bytes of the source port field in the TCP header. Whenever a TCP connection is initiated a unique source port number is assigned. To include another byte which will form a three bytes pointer or Flow, another byte is needed. That byte can be selected as Byte number 16 which represents ToS byte within the IP header. This three bytes combination is shown in block 614 of FIG. 6.

As it can be appreciated that the locations of the bytes needed to represent a Flow ID can be completely dynamic and can be nested in the different hierarchy of the Flows. A memory location accessed through the three bytes combination in the Shared Memory Block can either be occupied or vacant. If the memory location is occupied meaning that the location contains a non-zero number then this implies that the numeric value resulting in three bytes combination is of interest. On the other hand, if the memory location accessed by the three bytes combination in the Shared Memory Block is vacant then this means that the bit values yielding to that combination is not interesting. In other words, if a unique binary value generated through a Flow is interested then the Shared Memory will contain the Address Pointer that will in turn points to the Cache Memory where the further identification and the processing of the Flow will be done.

During the execution of the set of instructions 612, next flow ID 614 may be generated based on other portions (e.g., fields) of the control information of the data packet if a condition is met. For example, three bytes of the control information of the data packet may be read to generate the next flow ID 614 as illustrated in the instructions "read byte #35 & 36" and "read byte #16 (type of service (TOS))." Once the next flow ID 614 is generated, it may be used to access the next address pointer (e.g., APn 616) stored in the shared memory 606. Next, where a location of the next address pointer (APn) in the shared memory 606 may be determined by the next flow ID 614. Then, the processor 604 may perform an next set of instructions 616 stored in an next address in the cache memory 610 referred by the next address pointer (APn 616), where the next set of instructions 618 is loaded to the next address in the cache memory 610 if the next flow is currently active.

It may be necessary to identify the Round number that is executed between the Shared Memory and Cache Memory Routines. As mentioned that multiple rounds of independent Flows can be nested between the Shared Memory and Cached memory The Round Number Verification field 503 may indicate the bytes locations within a packet that identify the byte(s)/bit(s) position used to identify a particular round of a Flow. Once the next set of instructions 618 is fully executed, the set of instructions 612 may be continuously performed where it left off, or the processor 604 may terminate the operation of the set of instructions 612. Based on the execution of the set of instructions 612 and/or the next set of instructions 618, report data 624 may be generated or the data packet being processed may go through a change. The report data 624 may be forwarded to a display, such as the user interface device 112 of FIG. 1, or stored to a storage 620. It is appreciated that there can be more than 2 flow IDs nested although the example in FIG. 6 illustrates 2 flow IDs processed in sequence.

Figure 7:
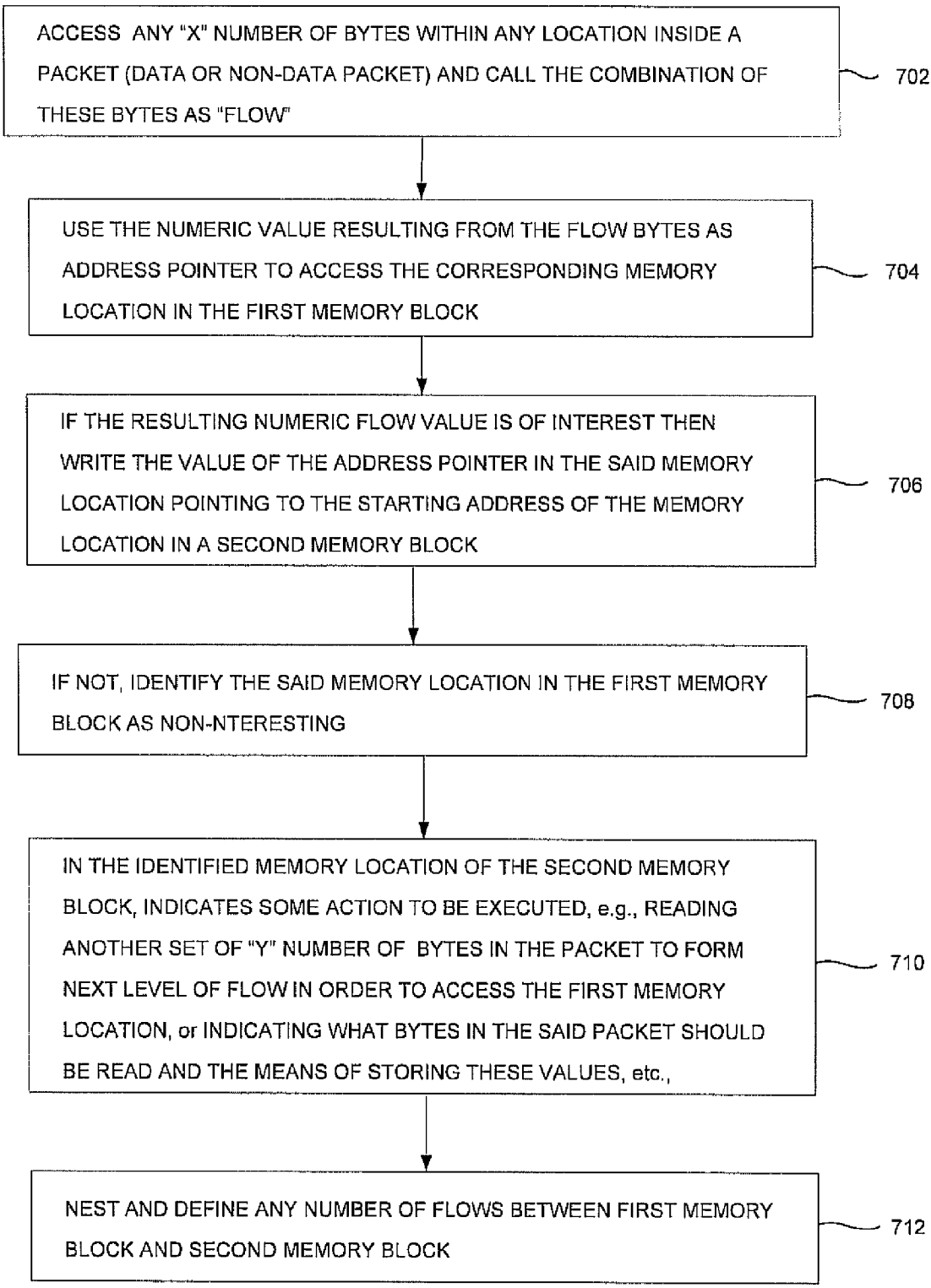
FIG. 7 is a process flow chart of an exemplary method for identifying a data packet by identifying a Flow, according to one embodiment.

FIG. 7 is a process flow chart of an exemplary method for identifying a data packet by identifying a Flow, according to one embodiment. According to one embodiment. In operation 702, any number of bytes within the header or from the payload of the data packet is accessed. In operation 704, the combination of these bytes is used as Flow and then a Memory Location corresponding to the said numeric value of the Flow in the First Memory Block is accessed. In operation 706, if the resulting numeric value is of any interest then an address pointer corresponding to the location in the second memory location is generated and stored. In operation 708, if the resulting numeric value of the Flow is not interested then the value stored in the memory location is left to known value that will represent that the given value generated through the Flow is not interested. In operation 710, certain operations can be performed to verify the current round of Flow and generate another set of Flow by reading certain bytes/bits within the given packet. In operation 712 any number of Flows can be defined and nested between First and Second Memory Blocks.

It is appreciated that FIG. 7 illustrates an exemplary process diagram for executing the method described in FIG. 6, according to one embodiment. It is also appreciated that FIG. 7 illustrates processes or steps for expeditiously identifying a data packet of an IP protocol type to determine a flow ID for the data packet of the IP protocol type. It is further appreciated that the steps described in FIG. 7 are performed with an assumption that processing of data packets over the network deals with an IP protocol type for the most part since a majority of the data processing over the network currently deals with data packets of the IP protocol type, especially the TCP, in reality.

One of the challenges in TCP based packets flow is to arrange the packets belonging to the same flow in the right sequence number. The packets may flow through different paths and as a result would arrive at the destination at different times. The same reasoning applies to any type of other packets that contains some sequencing number but arrives at the destination at different time due to the time difference.

Figure 8:
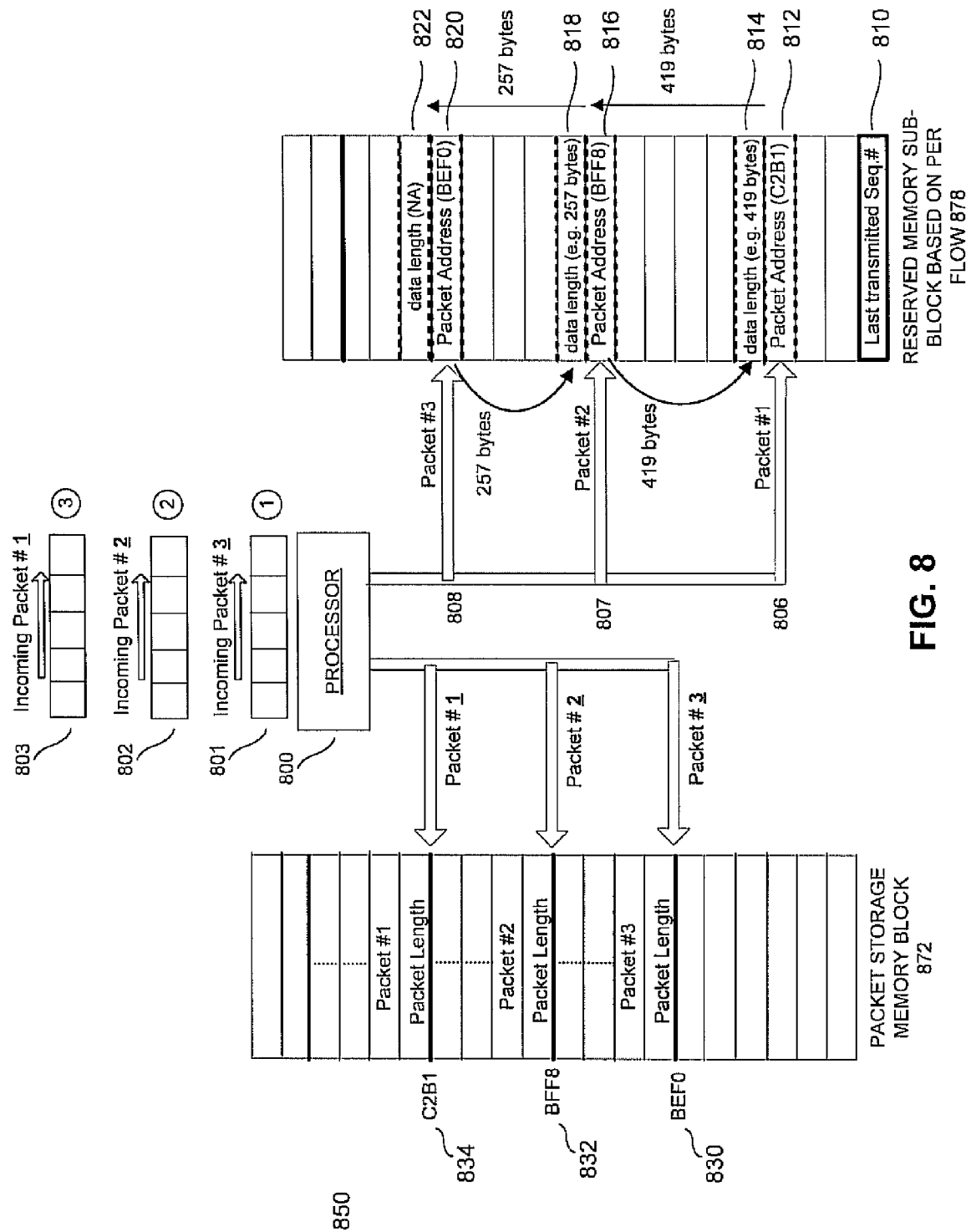
FIG. 8 illustrates a scheme in which packets carrying some type of numbering information can be properly arranged into the right sequence number, according to one embodiment.

FIG. 8 illustrates a scheme in which packets carrying some type of numbering information can be properly arranged into the right sequence number, according to one embodiment. Normally, there are two types of packets; individual packets carrying complete set of information and the packets where each packet carries a small chunk of information in it. The entire information is divided into stream of packets and it is necessary that the receiving end must put the packets into the right order so it can extract or replicate the same information. This requires that each packet carries some type of sequence number field that is used to identify the packet sequence and determine its position in the right order in the stream of the packets. For example, TCP segments carry information in small chunks. Each TCP header carries 32 bit sequence number field that is used to identify the right position of a given TCP segment in the stream of the packet flow.

As shown in the FIG. 8, three packets 801, 802, and 803 are received by the processor 800. As it can be seen that these three packets arrive at the processor completely out of sequence. In other words, the packet number 3, 801 is the last sequence number as compare to packet number 2 and packet number 1. The packet number 3 is stored at the memory location with the address BEF0, 814. Similarly the next incoming packet #2 is stored at the location BFF8 812 whereas the incoming packet #1 which has the first sequence is received at the last and is stored at the memory location with the address C2B1.

Once the processor 800 stores the first packet it then identifies the Flow of the packet. In TCP it equates to session number. Generally speaking the session number of a TCP session can be identified through the Source Port field in the TCP header which is generally picked up randomly during the initialization of a TCP connection. There are other ways to identify a TCP session. For example, a combination of different bits from the Sequence field, IP address, Source port number, Acknowledgement number field, etc of the TCP header can be used to identify a session. A reserved memory block is configured for every active TCP session. Each memory sub block contains memory locations being identified through unique addresses such that each location represents one byte or a smaller data unit that is used to measure the TCP payload either in bytes or in other data units as indicated through the TCP negotiation session. The Processor 800 reads pre-negotiated number of lower bits of the TCP sequence number field and identifies the corresponding memory location.

For example, packet #3, 803 lands on the memory location 808. The block identified by the memory location 808 is split into two fields, packet address field, 820 and the data length field. In the packet address field 820, the storage address location of the packet #3 is stored. As indicated the packet storage address for the packet #3 is stored at the location BEF0, 830 of the Memory Storage Block 872. The said address value (BEF0) is stored at the memory location 820. The packet payload length in bytes or in the other data units is calculated and stored at the memory location 818. In the memory location 818, the packet length is stored.

For example, if the payload length in bytes as measured by the TCP segment is 257 bytes then the memory location 818 is identified and in this field the value 257 is stored. Similarly, when the packet #2 arrives, the same lower bits as mentioned in the TCP are read and the Processor 800 accesses the memory location sub-block 807. In the memory location 816 the memory storage address BFF8 of the packet #2 Assuming the packet #2 payload length is 419 bytes the memory location is counted in bytes or in equivalent of TCP data unit blocks and the said length 419 bytes is written. With the similar procedure the packet #1 is stored into the memory location 806 with its storage address C2B1 stored at location 812. The TCP payload of the said packet is calculated and its value is stored in the memory location identified downward equivalent to the number of bytes or data units (not shown).

Figure 9A:
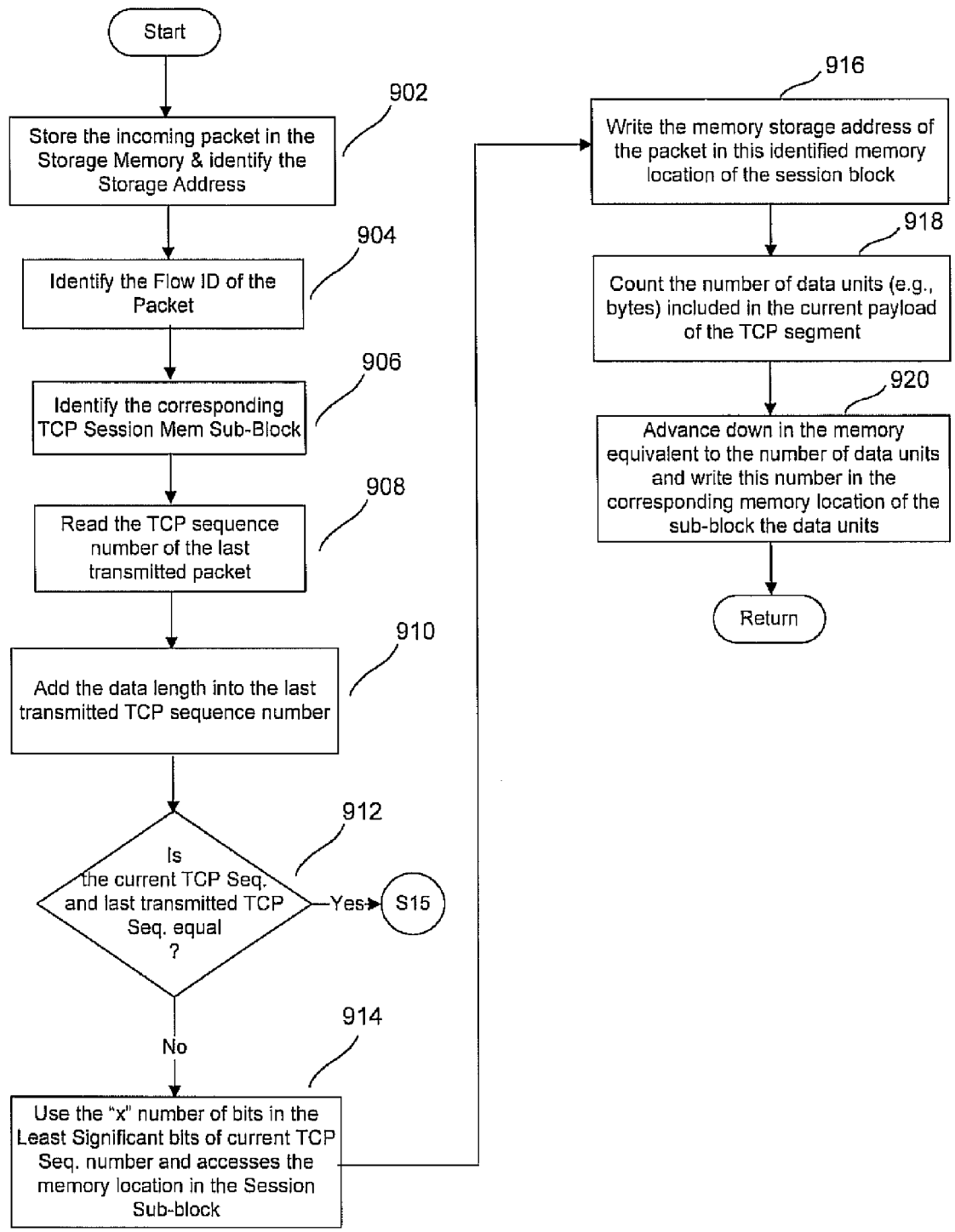
FIGS. 9A and 9B are a process flow chart of an exemplary method for re-sequencing TCP packets received out of the order in the right sequence, according to one embodiment.
Figure 9B:
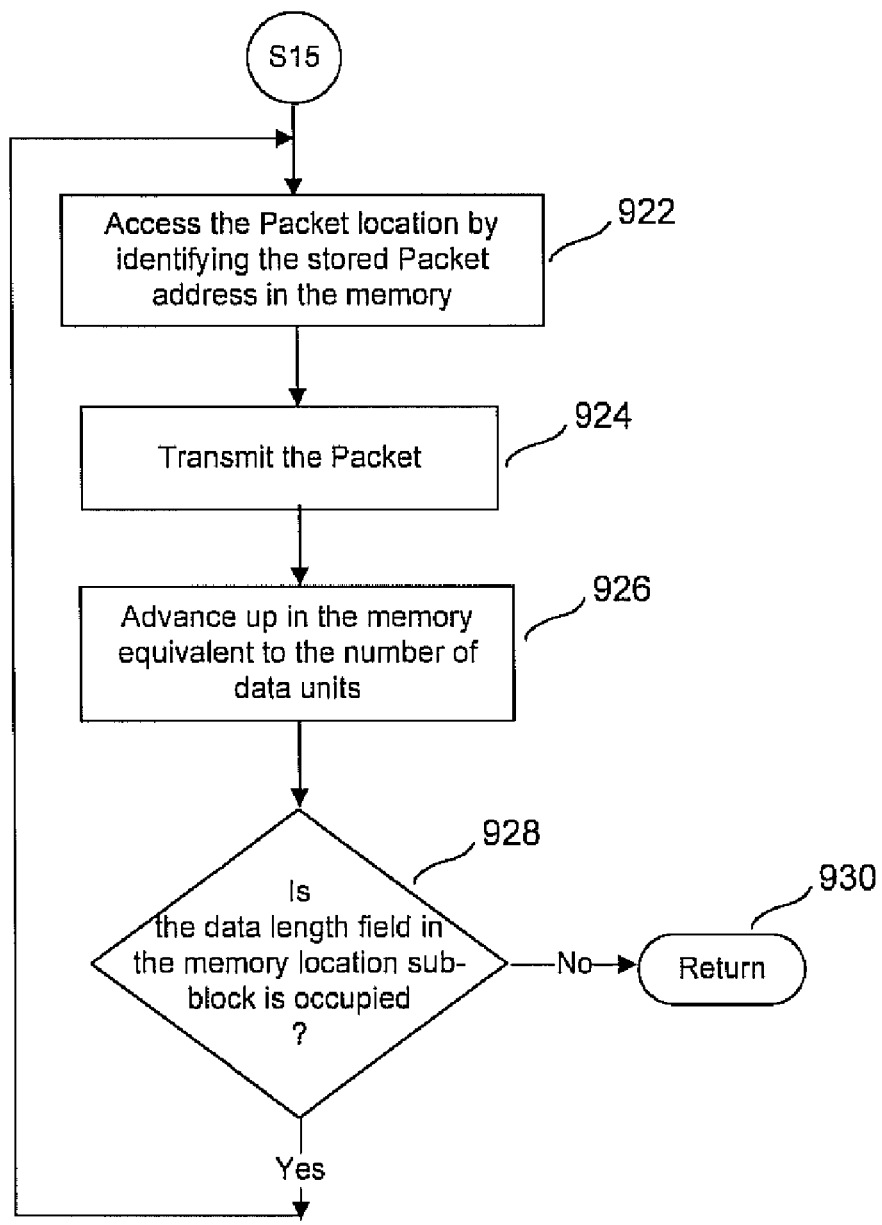

FIGS. 9A and 9B are a process flow chart of an exemplary method for re-sequencing TCP packets received out of the order in the right sequence, according to one embodiment. Step 902 stores the incoming packet in the storage memory and identifies the pointer address where the packet is stored. Step 904 identifies the Flow ID of the packet. As discussed the Flow ID indicates the TCP session in which the received packet belongs to. Step 906 identifies the right TCP session block which will be used to properly re-sequence the packets. Step 908 reads the TCP sequence number of the last packet successfully transmitted in the right order. In step 910, the processor adds the data length of the current packet into the last TCP sequence number. If the added value of the current packet payload into the sequence number of the last transmitted packet is equal then this means that the current packet is the next packet to the last transmitted packet. On the other hand, if this value is not same then this implies that there are missing packets in between the currently received and the last transmitted packets. Step 912 calculates the difference and reports either of the these two stated possibilities.

In step 914, the processor identifies a known number of least significant bits "x" of the TCP sequence field and accesses the memory location in the session block corresponding to these bits value. Step 916 writes the memory storage address where the packet is actually stored. In step 918, the processor counts the number of bytes in the current payload. In step 920, the processor writes the number of bytes of the current payload in the memory location identified either by counting bytes or other data units in the downward direction of the memory.

Returning to step 912, if the last transmitted sequence number becomes equal to the current sequence number after adding the payload of current packet into the last transmitted sequence number then the processor branches to S15 as shown in FIG. 9B. In step 922, the processor accesses the packet to transmit it through identifying the location of the packet currently stored. This is done by reading the address of the stored packet location. Step 924 transmits the packet. In step 926, the processor advances up in the memory equivalent to the indicated bytes or the data units. Step 928 determines if the memory location advanced up in the session sub-block is occupied or not. If it is occupied then this means that the located sub-block contains the next packet sequence number. As discussed the lower bytes of the said sub-block contains the storage address of the packet. The processor reads this address and transmits the packet. The processor branches back to step 924 where it transmits the packet. In step 926, the processor advances up the equivalent number of bytes and checks if the identified location is occupied. If it is occupied then it loops back from step number 928 and transmits the packet through steps 922 and 924. If the field is not occupied then the processor returns to step 930 which indicates that the next packet should be processed.

Figure 10:
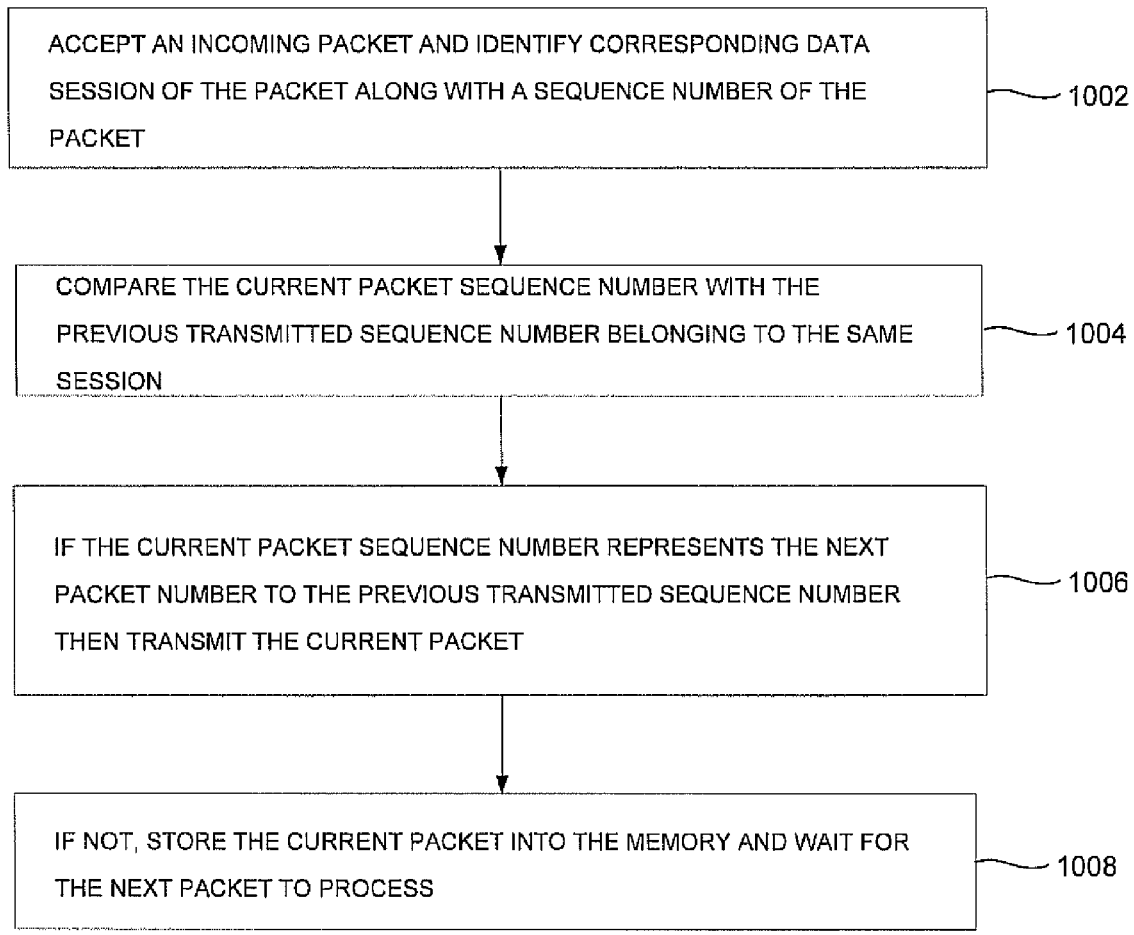
FIG. 10 illustrates a process flow chart of an exemplary method for arranging any type of packets that contain some kind of sequencing number, according to one embodiment.

FIG. 10 illustrates a process flow chart of an exemplary method for arranging any type of packets that contain some kind of sequencing number, according to one embodiment. For example, the presented scheme can be used to arrange RTP type packets that contain sequence numbering fields. In operation 1002, an incoming packet is accepted and a corresponding data session of the packet is identified along with the sequence number of the packet. In operation 1004, the current packet sequence number is compared with the previous transmitted sequence number belonging to the same session. In operation 1006, the current packet is transmitted if the current packet sequence number represents the next packet number to the previous transmitted sequence number. If not, in operation 1008, the current packet is stored into the memory until a next packet arrives.

Figure 11:
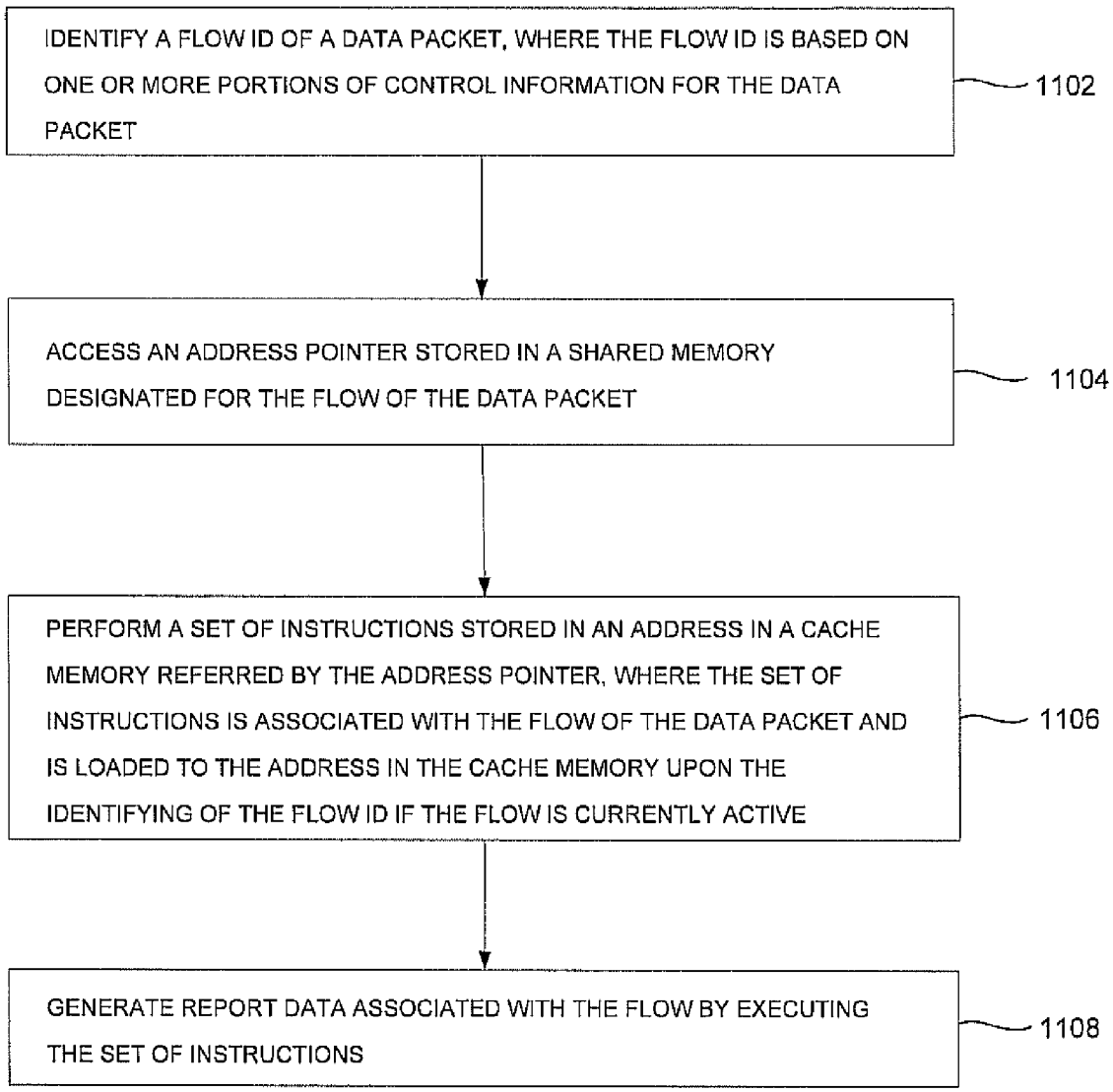
FIG. 11 is a process flow chart of an exemplary method for processing data packets according to their respective flow IDs, according to one embodiment.

FIG. 11 is a process flow chart of an exemplary method for processing data packets according to their respective flow IDs, according to one embodiment. In operation 1102, a flow Identification (ID) of a data packet is identified, where the flow ID is based on one or more portions of control information for the data packet. In operation 1104, the current packet sequence number is compared with the previously transmitted sequence number of the same session. In operation 1106, if the current sequence packet represents the next packet in the sequence then transmit the current packet. In operation 1108, if the current packet does not represent the next packet to the previously transmitted packet then store the current packet and wait for the next packet to process.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for processing a data packet in a flow, comprising:
   identifying a flow Identification (ID) of the data packet, wherein the flow ID is based on at least one portion of control information for the data packet;
   accessing an address pointer stored in a shared memory designated for the flow of the data packet, wherein a location of the address pointer in the shared memory is determined by the flow ID of the data packet;
   performing a set of instructions stored of an address in a cache memory which is referred by the address pointer, wherein the set of instructions is associated with the flow of the data packet and is loaded to the address in the cache memory upon the identifying of the flow ID if the flow is currently active; and
   generating report data associated with the flow by executing the set of instructions.

2. The method of claim 1, wherein the identifying the flow ID of the data packet comprises:
   accessing 2 bytes of an Ethertype field and 1 byte of an IP protocol type field of the data packet;
   performing an exclusive OR (XOR) operation to the 2 bytes of the Ethertype field of the data packet with corresponding 2 bytes designated for an Ethertype field for an internet protocol version 4 (IPv4) to generate a first value, wherein the 2 bytes of the Ethertype field for the IPv4 is 0 X 0800 (hex);
   adding a first byte of the first value and a second byte of the first value to generate a second value;
   appending the 1 byte of the IP protocol type field of the data packet to the second value to generate a third value if the second value matches with 0 X 00 (hex); and
   determining an IP protocol type of the data packet based on the third value.

3. The method of claim 2, wherein the identifying the flow ID of the data packet comprises determining the data packet as a non-IP protocol type if the second value does not match with 0 X 00 (hex).

4. The method of claim 2, wherein the flow ID is determined by combining 2 least significant bytes (LSBs) of port number and 1 most significant byte (MSB) of acknowledgement number if an IP protocol type of the data packet is based on transmission control protocol (TCP).

5. The method of claim 2, wherein the flow ID is determined by combining 2 LSBs of port number and 1 byte of LSB of a client IP address if an IP protocol type of the data packet is based on user datagram protocol (UDP).

6. The method of claim 2, wherein the flow ID is determined by combining 1 LSB of a server IP address, 1 LSB of a client IP address and 1 byte of an IP protocol type if an IP protocol type of the data packet is based on IP in IP.

7. The method of claim 1, wherein the location of the address pointer in the shared memory is generated if the flow ID doesn't exist in the shared memory.

8. The method of claim 1, wherein the set of instructions is generated in response to configuration data received prior to the processing of the data packet.

9. The method of claim 8, wherein the configuration data is used for setting a flag data for the IP protocol type such that the report data is generated for any data packet of the IP protocol type.

10. The method of claim 1, wherein the set of instructions is associated with a check for quality of service (QoS) of a network processing the data packet.

11. The method of claim 1, wherein the set of instructions comprises at least one instruction for generating an next flow ID based on other portions of the control information of the data packet if a condition is met.

12. The method of claim 11, wherein, if the next flow ID exists in the shared memory, the next flow ID is operable for:
   accessing an next address pointer stored in the shared memory designated for the next flow of the data packet, wherein a location of the next address pointer in the shared memory is determined by the next flow ID; and
   performing an next set of instructions stored in an next address in the cache memory assigned by the next address pointer, wherein the next set of instructions is loaded to the next address in the cache memory if the next flow is currently active.

13. The method of claim 1, wherein the performing the set of instructions stored in the address in the cache memory comprises generating an address pointer for a memory location for storing the report data.

14. A method for identifying an IP protocol type of a data packet, comprises:
   accessing 2 bytes of an Ethertype field and 1 byte of an IP protocol type field of the data packet, wherein the data packet is received from a network;
   performing an exclusive OR (XOR) operation to the 2 bytes of the Ethertype field of the data packet with corresponding 2 bytes designated for an Ethertype field for an internet protocol version 4 (IPv4) to generate a first value, wherein the 2 bytes of the Ethertype field for the IPv4 is 0 X 0800 (hex);
   adding a first byte of the first value and a second byte of the first value to generate a second value;
   appending the 1 byte of the IP protocol type field to the second value to generate a third value if the second value matches with 0 X 00 (hex); and
   determining an IP protocol type of the data packet based on the third value.

15. The method of claim 14, wherein identifying a flow ID of the data packet comprises determining the data packet as a non-IP protocol type if the second value does not match with 0 X 00 (hex).

16. The method of claim 14, wherein a flow ID is determined by combining 2 least significant bytes (LSBs) of port number and 1 most significant byte (MSB) of acknowledgement number if an IP protocol type of the data packet is based on transmission control protocol (TCP).

17. The method of claim 14, wherein a flow ID is determined by combining 2 LSBs of port number and 1 byte of LSB of a client IP address if an IP protocol type of the data packet is based on user datagram protocol (UDP).

18. The method of claim 14, wherein a flow ID is determined by combining 1 LSB of a server IP address, 1 LSB of a client IP address and 1 byte of an IP protocol type if an IP protocol type of the data packet is based on IP in IP.

19. A non-transitory computer readable medium for inspecting and processing a data packet in a flow having instructions that, when executed by a computer, cause the computer to perform a method comprising:
   identifying a flow Identification (ID) of the data packet, wherein the flow ID is based on at least one portion of control information for the data packet;
   accessing an address pointer stored in a shared memory designated for the flow of the data packet, wherein a location of the address pointer in the shared memory is determined by the flow ID of the data packet;
   performing a set of instructions stored of an address in a cache memory which is referred by the address pointer, wherein the set of instructions is associated with the flow of the data packet and is loaded to the address in the cache memory upon the identifying of the flow ID if the flow is currently active; and
   generating report data associated with the flow by executing the set of instructions.

20. The non-transitory computer readable medium of claim 19, wherein the identifying the flow ID of the data packet comprises:
   accessing 2 bytes of an Ethertype field and 1 byte of an IP protocol type field of the data packet;
   performing an exclusive OR (XOR) operation to the 2 bytes of the Ethertype field of the data packet with corresponding 2 bytes designated for an Ethertype field for an internet protocol version 4 (IPv4) to generate a first value, wherein the 2 bytes of the Ethertype field for the IPv4 is 0 X 0800 (hex);
   adding a first byte of the first value and a second byte of the first value to generate a second value;
   appending the 1 byte of the IP protocol type field of the data packet to the second value to generate a third value if the second value matches with 0 X 00 (hex); and
   determining an IP protocol type of the data packet based on the third value.

* * * * *